(12) United States Patent
Daly et al.

(10) Patent No.: US 7,102,768 B2
(45) Date of Patent: *Sep. 5, 2006

(54) PRINTER DRIVERS USING FILTERS THAT ARE OPERATING SYSTEM-INDEPENDENT AND PRINTER-INDEPENDENT

(75) Inventors: John P. Daly, Eagle, ID (US); James S. Boyce, Meridian, ID (US); Elliot Lee Klosterman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/638,572

(22) Filed: Aug. 11, 2003

(65) Prior Publication Data

US 2004/0032611 A1    Feb. 19, 2004

Related U.S. Application Data

(63) Continuation of application No. 09/305,241, filed on May 4, 1999, now Pat. No. 6,661,526.

(51) Int. Cl.
*G06F 3/12* (2006.01)
*G06K 15/00* (2006.01)
*G06K 1/00* (2006.01)

(52) U.S. Cl. .................................. 358/1.13; 358/1.14
(58) Field of Classification Search ......... 358/1.1–1.18
See application file for complete search history.

(56) References Cited

U.S. PATENT DOCUMENTS

| 5,604,843 | A | 2/1997 | Shaw et al. |
| 5,845,058 | A | 12/1998 | Shaw et al. |
| 6,202,147 | B1 | 3/2001 | Slaughter et al. |
| 6,222,638 | B1 * | 4/2001 | Otala .................. 358/1.18 |

* cited by examiner

*Primary Examiner*—Douglas Q. Tran

(57) ABSTRACT

A printer driver uses filters that are operating system-independent and printer-independent. Print requests and corresponding print data are received by the printer driver and converted into an internal representation that is both operating system-independent and printer-independent. The data to be printed is then passed through a print pipeline where one or more of a plurality of print filters are applied to the data. As a final stage in the print pipeline, the data is converted to a printer-dependent representation. In one embodiment, one or more of the plurality of filters used in the print pipeline are stored in a dynamic link library (DLL).

12 Claims, 6 Drawing Sheets

PRINTER DRIVERS USING FILTERS THAT ARE OPERATING SYSTEM-INDEPENDENT AND PRINTER-INDEPENDENT

RELATED APPLICATIONS

This application is a continuation of prior application Ser. No. 09/305,241, filed May 4, 1999 now U.S. Pat. No. 6,661,526, entitled "Printer Drivers Using Filters That Are Operating System-Independent and Printer-Independent", which is hereby incorporated by reference.

TECHNICAL FIELD

This invention relates to printers, and more particularly to printer drivers having filters that are both operating system-independent and printer-independent.

BACKGROUND

Printers have become an indispensable peripheral component for use with computers. Generally, data that is to be printed by an application is transferred to a "printer driver" via an operating system. The printer driver is a software module that translates the data to be printed into a format that is understandable by the printer. Various additional formatting options may also be provided by the driver, such as adding water marks, re-sizing the data for a page (e.g., expanding or shrinking the data to fit on a particular number of pages), etc.

Printer drivers are typically written by the printer manufacturer and are designed to work with a particular printer as well as a particular operating system. Different drivers generally need to be written for each possible printer/operating system combination that the printer manufacturer wants to support. Maintaining separate printer drivers for each printer/operating system combination is a particularly burdensome task for the printer manufacturer. Furthermore, given that many of the same formatting options are provided by each of the drivers (e.g., adding water marks), maintaining separate printer drivers for each printer/operating system combination causes repetitive efforts as each formatting option is designed into each of the printer/operating system combinations.

Additionally, situations can arise where it is desirable to alter the programming of a printer driver. Examples of such situations include the need to change the code for one of the formatting options in order to fix a bug or other error in the code, to provide increased functionality, etc. However, changing the programming of any one of the formatting options requires recompiling the entire printer driver, including those parts of the driver not affected by the change in formatting option. Additionally, if the formatting option is changed after the printer driver has been distributed to the public, then the entire re-compiled driver must be re-distributed and re-installed by the public.

This invention addresses these disadvantages, providing an improved way to generate printer drivers.

SUMMARY

A printer driver in accordance with the invention uses filters that are operating system-independent and printer-independent. Print requests and corresponding print data are received by the printer driver and converted into an internal representation that is both operating system-independent and printer-independent. The data to be printed is then passed through a print pipeline where one or more of a plurality of print filters are applied to the data. As a final stage in the print pipeline, the data is converted to a printer-dependent representation.

According to one aspect of the invention, a filter list is maintained by the printer driver. The filter list identifies the print filters that are part of the print pipeline and also identifies the order in which the filters are to be applied to the data to be printed.

According to another aspect of the invention, one or more of the plurality of filters used in the print pipeline are stored in a dynamic link library (DLL). The filters in the DLL are bound to the printer driver at run-time, allowing the filters in the DLL to be generated (and/or changed) after the printer driver is compiled.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The invention can be used in either a network environment or a non-network environment. The invention provides an improved way to generate, operate, and maintain printer drivers. The printer drivers can be located at a client computer, an intermediary computer, a printer, or any combination thereof.

Figure 1:
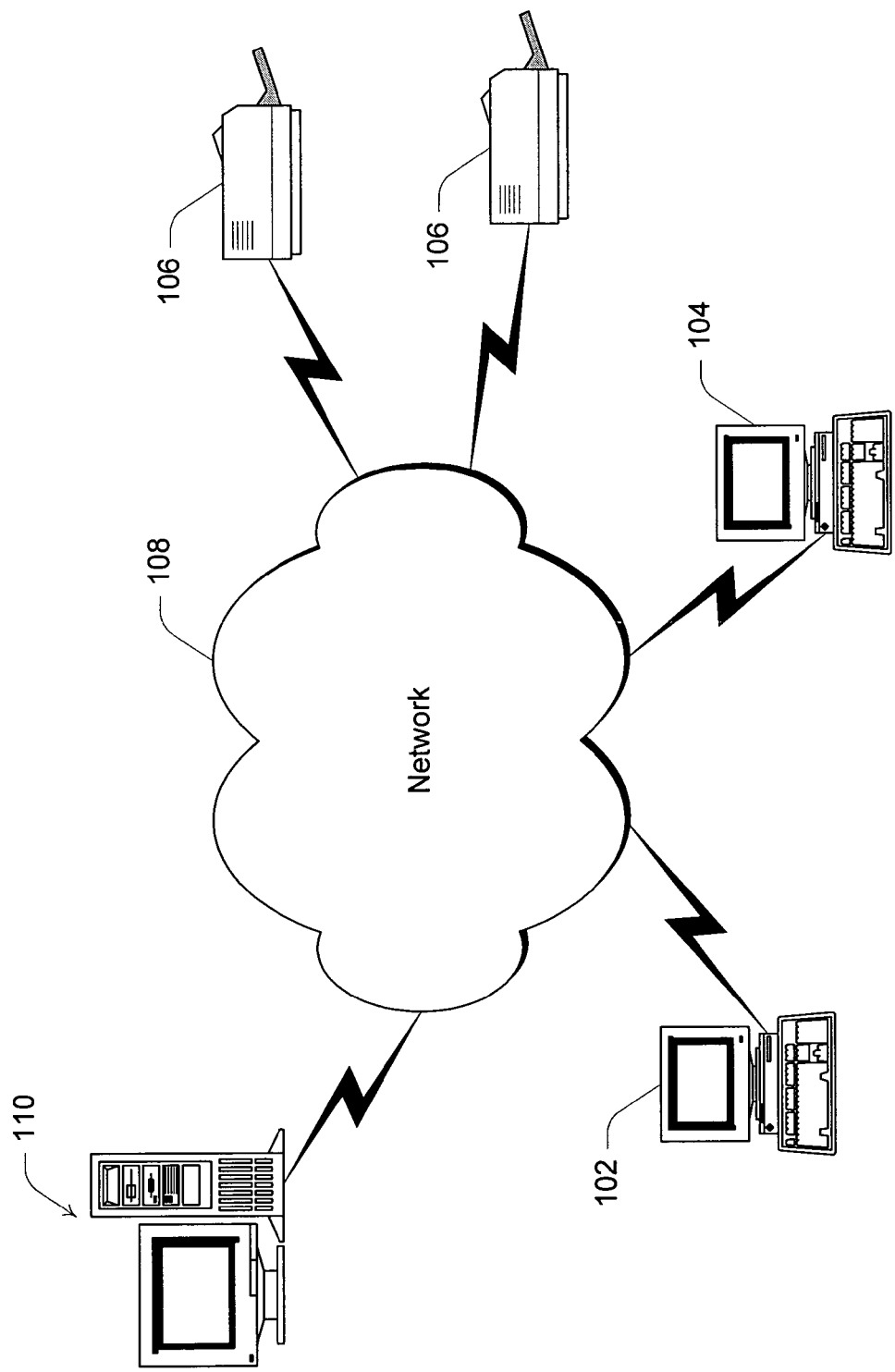
FIG. 1 shows an exemplary network system in which the invention can be used.

FIG. 1 shows an exemplary network system in which the invention can be used. Generally, the network system includes multiple (n) client computers 102 and 104 and one or more networked printers 106. The computers 102 and 104 communicate with printers 106 over a data communications network 108. In the illustrated example, data communications network 108 can include one or more of: the Internet, PSTN networks, local area networks (LANs), and private wide area networks (WANs). Communication between client computers 102 and 104 and printers 106 can be via any of a variety of conventional communication protocols. Client computers 102 and 104 transfer data to be printed to printers 106 via network 108.

When an application executing on one of computers 102 or 104 wants to print data, the application provides (typically via an operating system) a print request to a printer driver (not shown in FIG. 1) that corresponds to one of printers 106. The printer driver translates the print request and corresponding data into a representation or form that is understandable to the printer 106 (that is, in the printer's "language"). Various additional formatting options may also be implemented by the printer driver. For example, the size of the data being printed may be increased or decreased, a watermark may be added, the order of pages being printed may be changed, etc. Once such translation and formatting options have been performed, the appropriate printer 106 can print the data.

One or more print servers 110 may also be coupled to network 108. Print server 110 acts as an intermediary between the client computers 102 and 104 and the printers 106. Data that is to be printed is transferred from client computers 102 and 104 to print server 110. Print server 110 then assumes responsibility for transferring the data to printers 106.

The printer driver for a printer 106 can be implemented at the client 102 or 104, at the printer 106, at the print server 110, or alternatively at a combination of one or more of the client 102 or 104, printer 106, and print server 110.

Figure 2:
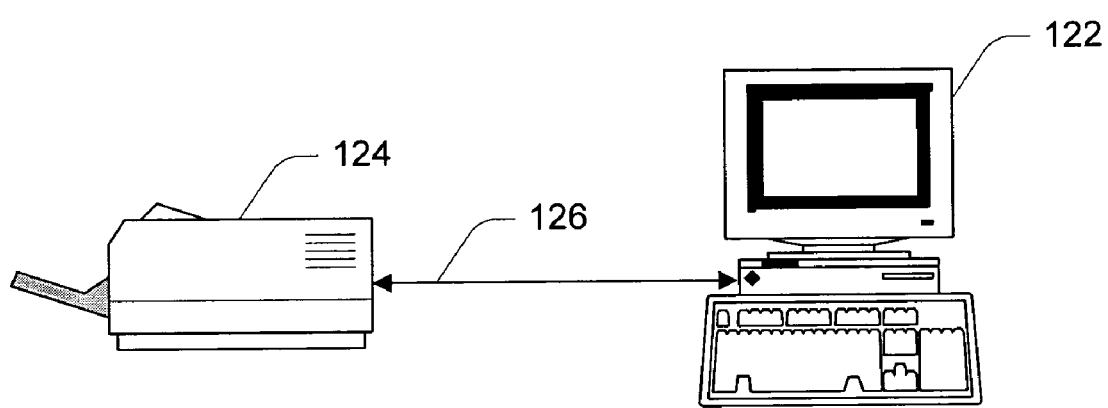
FIG. 2 illustrates an exemplary non-network system in which the invention can be used.

FIG. 2 illustrates an exemplary non-network system in which the invention can be used. A computer 122 is coupled directly to a printer 124. Computer 122 and printer 124 communicate with each other directly via connection 126 without accessing a network. The printer driver (not shown) for printer 124 can be implemented at the computer 122 and/or the printer 124.

The printers 106 of FIG. 1 and printer 124 of FIG. 2 can be any of a wide variety of conventional printing or output devices. Such output devices can be physical devices (e.g., laser printers, inkjet printers, dot matrix printers, facsimile machines, plotters, etc.), software applications (e.g., a facsimile program running on a computer), data structures (e.g., files to be stored to disk or transferred over a network), etc.

Figure 3:
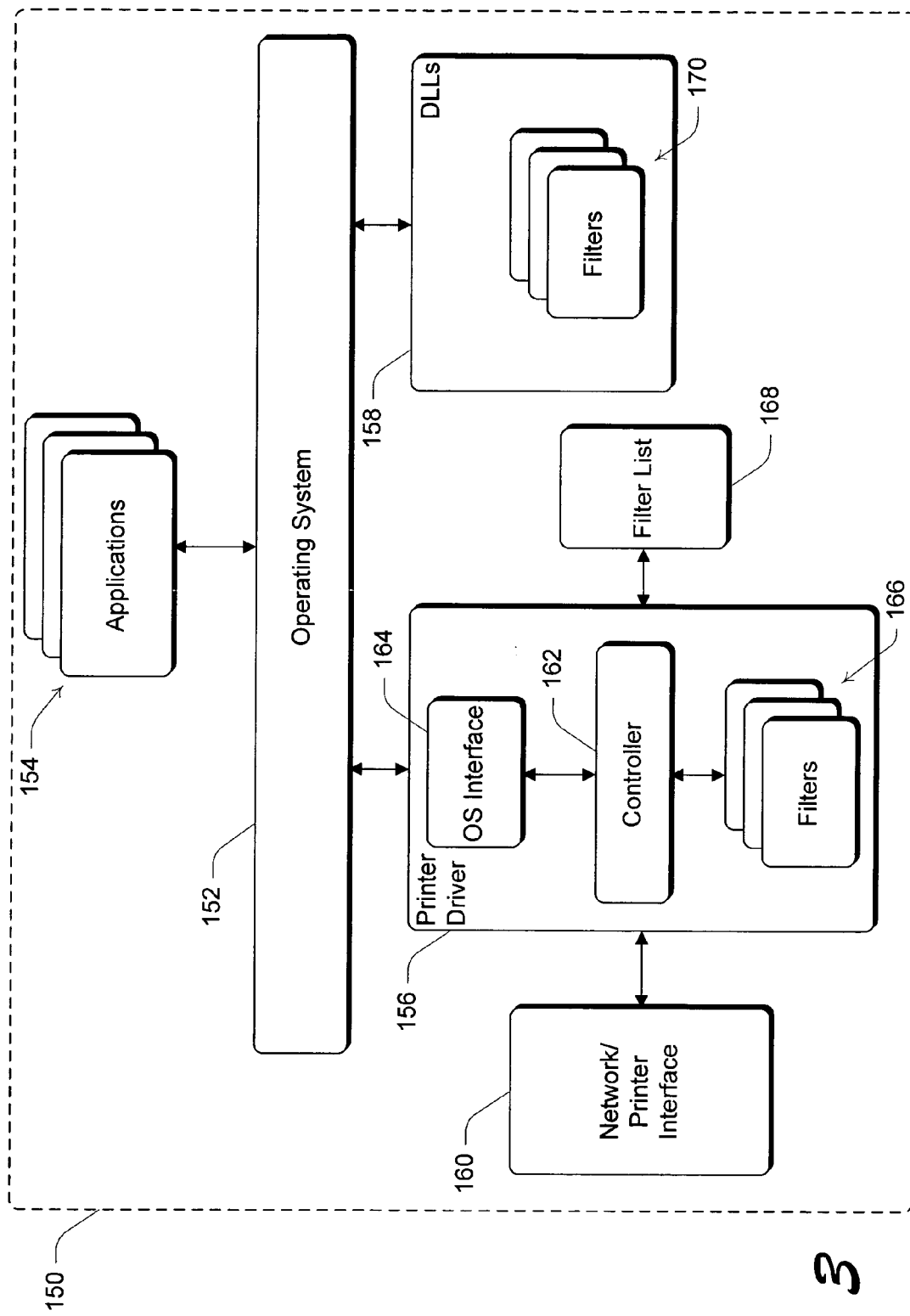
FIG. 3 illustrates an exemplary system architecture including a printer driver in accordance with the invention.
Figure 4:
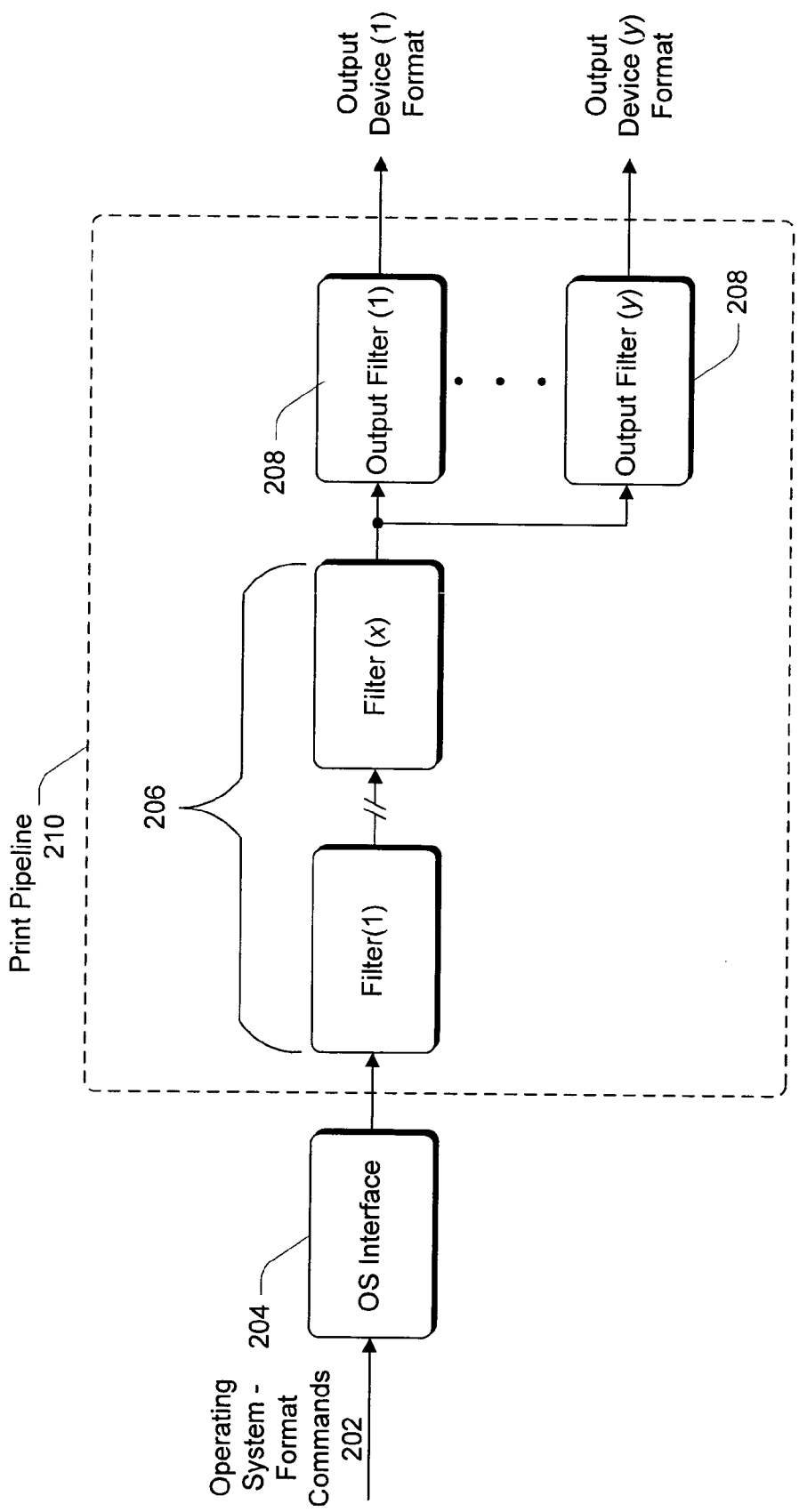
FIG. 4 is an exemplary illustration of the flow of print requests and corresponding data through a printer driver in accordance with the invention.

FIG. 3 illustrates an exemplary system architecture including a printer driver in accordance with the invention. System 150 can be either a computer (such as client computers 102 or 104 of FIG. 1, printer server 110 of FIG. 1, or computer 122 of FIG. 2) or alternatively a printer (such as printer 106 of FIG. 1 or printer 124 of FIG. 2). System 150 includes an operating system 152, one or more applications 154, a printer driver 156, one or more dynamic link libraries (DLLs) 158, and a network/printer interface 160. Only one printer driver 156 has been illustrated in FIG. 3 for ease of explanation and to avoid cluttering the drawings. It is to be appreciated that system 150 can include multiple drivers 156.

One or more of applications 154 can provide a print request and corresponding data to be printed to operating system 152. Operating system 152 provides the print request and corresponding data to printer driver 156, which translates and formats the print request and corresponding data into a representation that is understandable by the printer. The translated and formatted request and data are then provided to network/printer interface 160 which transfers the request and data to the appropriate printer (either via a network or directly to the printer).

Operating system 152 represents any of a wide variety of conventional operating systems. Examples of such operating systems include, but are not limited to, any of the "Windows" brand of operating systems available from Microsoft Corporation of Redmond, Wash., or the Mac OS available from Apple Computer of Cupertino, Calif.

Network/printer interface 160 is an input/output (I/O) interface that allows system 150 to communicate with either computer(s) or printer(s) directly or via a network.

Printer driver 156 includes a controller 162, an operating system (OS) interface 164, and one or more print filters 166. Operating system interface 164 receives print requests and corresponding data from operating system 152. The print request and corresponding data are received from the operating system in an operating system-dependent format. This operating system-dependent format is a representation of the request and data that is understandable to the operating system. Interface 164 converts the request and data into an operating system-independent format. That is, interface 164 converts the request and data to an internal representation used by printer driver 156.

Interface 164 also generates a "settings" data structure that is used by other components of driver 156. The settings structure identifies various aspects of how the data corresponding to the print request is to be printed (e.g., order of pages, size of fonts, page breaks, use of watermarks or copyright notices, etc.), as well as the destination device(s) for the data. This settings structure is passed from filter to filter by controller 162, allowing each invoked filter to change the aspects as programmed.

Controller 162 coordinates the various components of printer driver 156, ensuring that the proper filters are applied to received data in the proper order. Controller 162 also maintains a filter list 168 listing identifiers of the filters 166 (as well as any filters 170, discussed in more detail below). Any one of the filters 166 or 170 can be invoked by controller 162 using a call, instruction, or other identifying information regarding the filter maintained in filter list 168.

Each of the filters 166 and 170 alters or modifies the printing format of the data to be printed or a destination(s) of the data to be printed. Examples of altering the printing format of the data to be printed include page manipulation (e.g., causing the pages of data to be printed so that physical pages are printed from back to front, associating multiple logical pages with a single physical page, etc.) and image manipulation (e.g., increasing or reducing the size of the data to be printed on a single physical page, adding a watermark to the data, adding a copyright notice to the data, etc.). An example of altering the destination of the data to be printed is a routing filter that causes the data (or just the print request without the corresponding data) to be routed to a file or to an additional printer.

In the illustrated example, filters 166 also include at least one "output" or "page description language" filter. The output filter converts the print request and corresponding data from the internal representation used by printer driver 156 to a representation that is understandable by the printer. Output filters can be included in filters 166 to generate virtually any language representation, allowing printer driver 156 to support an unlimited number of devices. An example of such a conversion is to a page description language (PDL) such as the well-known PCL5, PCL6, PCL XL, or Postscript languages. It can be said that prior to conversion by the output filter the interface 164 converted the print request and corresponding data were to an operating system independent and printer independent representation or format. It can also be said That following conversion by the output filter, the print request and corresponding data are in a printer dependent representation or format.

Upon receiving a translated print request and corresponding data, controller 162 invokes the appropriate filters 166. The order in which the filters are applied is determined by the order in which the filter identifiers appear in filter list 168.

Which of the filters is to be applied is provided to printer driver 156 by operating system 152 along with the print request. This identification can be generated by operating system 152, or alternatively by the application 154 that initiated the print request. In the illustrated example, operating system 152 provides a user interface (UI), upon receipt of the print request from the application 154, that prompts the user for feedback regarding which filters are to be applied. For example, a user may be able to select (e.g., via menu option or radio button) that a watermark is to be included, or that the pages are to be printed in reverse order. Alternatively, a component of printer driver 156 (e.g., controller 162) could provide a UI that prompts the user for feedback regarding which filters are to be applied.

In the illustrated example, printer driver 156 is a software module that is compiled to include filters 166. Thus, the print filters 166 are made a part of printer driver 156 at the time driver 156 is compiled.

Additionally, one or more print filters 170 can be bound or linked to driver 156 at run-time using a run-time loadable module(s). In contrast to filters 166, filters 170 are in a module(s) that is bound to the driver 156 at run-time of driver 156 by the operating system 152. In the illustrated example, filters 170 are implemented in one or more dynamic link libraries (DLLs).

Incorporating print filters 170 as DLLs provides multiple advantages. By using DLLs, the filter need not be written at the time the printer driver 156 is written, compiled, and publicly distributed. This is particularly useful, for example, in situations where no need for a particular filter exists at the time the printer driver is distributed, but such a need arises at a later time. An additional advantage is that filters can be changed individually without requiring recompiling of the entire printer driver. For example, if a revised version of a filter 170 is available after the original version of the filter has been distributed to users (e.g., to provide additional functionality or to correct an error/bug in the original version), the revised filter could be replaced without requiring replacement or modification of any other filters 166 or 170 or the remainder of printer driver 156.

An additional driver interface is included in system 150 that allows developers (e.g., third party developers) to add filters 170. This additional driver interface can be implemented as part of printer driver 156 (e.g., part of controller 162) or alternatively as one of applications 154 that has access to filter list 168 or as part of operating system 152. The additional driver interface inserts identifiers of filters 170 into filter list 168.

Identifiers of the filters 170 are also added to filter list 168. The identifiers of filters 170 are inserted into list 168 at locations that are identified (e.g., by the filter designer) at the time the filters 170 are added to system 150. The appropriate location is identified (e.g., by the filter designer) via the additional driver interface.

F*ig*. 4 is an exemplary illustration of the flow of print requests and corresponding data through the printer driver 156 of FIG. 3 in accordance with the invention. A print request and corresponding data are received from the operating system as an operating system command 202. The data is then translated into en internal language by interface 164 of FIG. 3 (block 204). In other words, step 204 involves converting the data to an operating system independent and printer independent representation or format. One or more print filters are then applied to the data (blocks 206) to alter the format of the data to be printed. The data is then provided to one or more output filters (blocks 208) for conversion into a format understandable by the output device (e.g., a printer or facsimile machine), such as the PCL5 or PCL6 page description languages, printer dependent formats. The filters that are applied (blocks 206 and 208) are referred to as the "print pipeline" 210. The converted data is then transferred to the appropriate output device(s).

Alternatively, the print pipeline 210 may be implemented over multiple devices. For example, the one or more print filters applied to the data in blocks 206 may be implemented at the computer where the print request was initiated (e.g., computer 102 of FIG. 1). Once all of the print filters in blocks 206 have been applied to the data, this "intermediate" filtered data can be provided to another device, such as print server 110 or printer 106 of FIG. 1, where the output filters (blocks 208) are applied.

Figure 5:
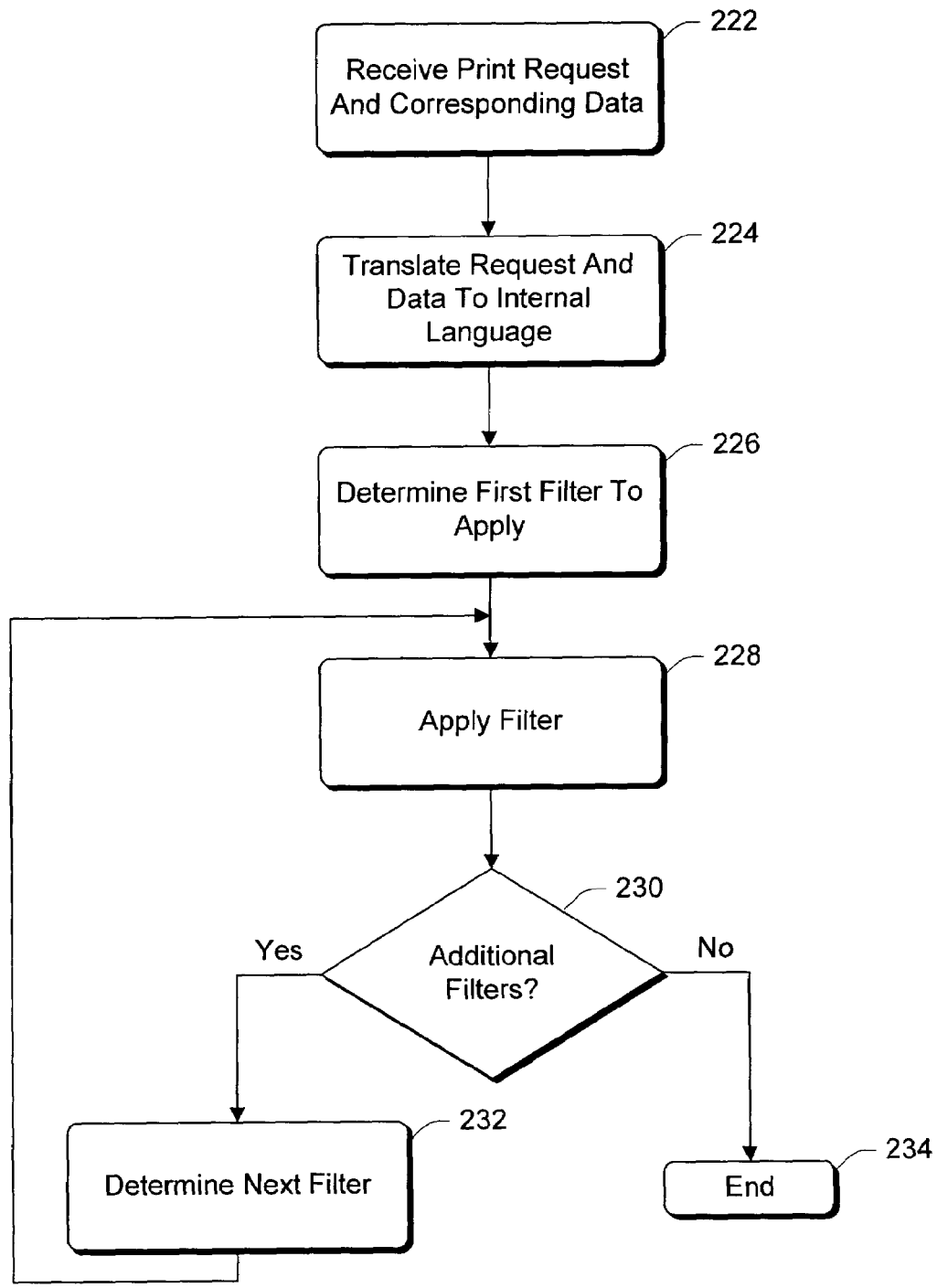
FIG. 5 is a flowchart illustrating an exemplary process for using a print pipeline in accordance with the invention.

FIG. 5 is a flowchart illustrating an exemplary process for using a print pipeline in accordance with the invention. The process of FIG. 5 is implemented by system 150 of FIG. 3, and in the illustrated example is performed in software. FIG. 5 is described with additional reference to components in FIG. 3.

A print request and corresponding data are first received by the printer driver 156 (step 222). The received request and corresponding data are translated into an internal language by interface 164 (step 224). Controller 162 then determines the first filter to apply to the data (step 226). The first filter to apply is dependent, as discussed above, on both the filters identified in the print request as well as the ordering of filters in the filter list 168.

The filter that is determined in step 226 is then applied to the data to be printed (step 228). The filter is applied to the data by controller 162 invoking the filter which in turn alters the data in accordance with the instructions programmed into the filter. Once the filter determined in step 226 finishes executing, controller 162 determines whether there are additional filters to be applied (step 230). If there are additional filters to be applied then controller 162 determines the next filter to apply (step 232). The determinations in steps 230 and 232 are both based on the filters identified in the print request as well as the ordering of filters in the filter list 168. Once the next filter to apply is determined, controller 162 applies that filter (step 228). Once controller 162 determines in step 230 that no additional filters are to be applied, the process ends (step 234).

Figure 6:
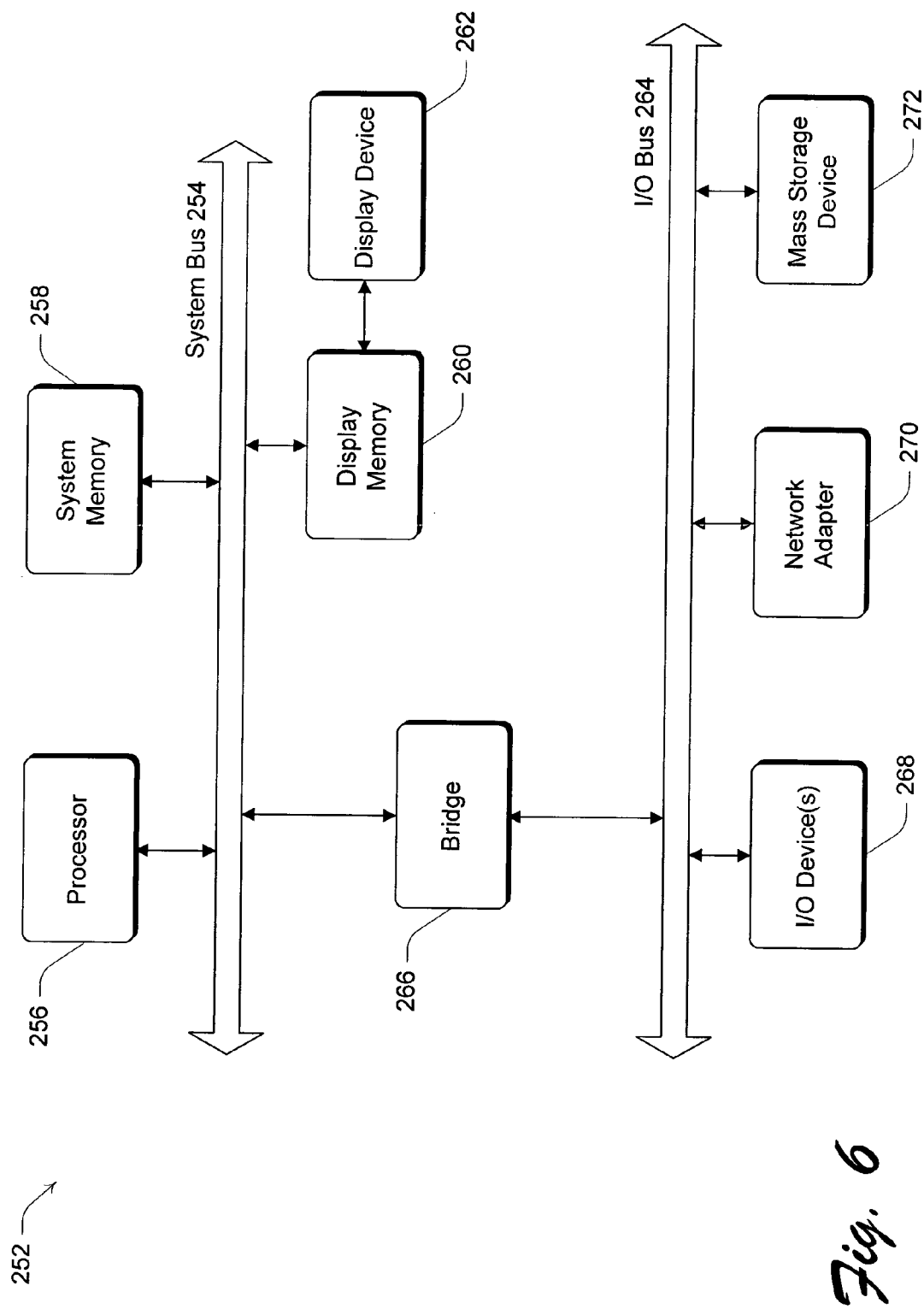
FIG. 6 illustrates an exemplary computer system in which the invention can be implemented.

FIG. 6 illustrates an exemplary computer system in which the invention can be implemented. The system 252 includes a system bus 254 for communicating information, a processor(s) 256 coupled with the bus for processing information and instructions, and a system memory (e.g., random access memory) 258 coupled with the bus 254 for storing information and instructions for the central processor 256. A display memory 260, coupled to a display device 262, is also coupled to the bus 254. Display memory 260 provides storage for data to be displayed on device 262. Alternatively, system 252 may not include display memory 260 and use system memory 258 for storage of data to be displayed on device 262. The display device 262 can be any device suitable for creating graphic images and/or alphanumeric (or ideographic) characters, such as a liquid crystal device or cathode ray tube.

System bus 254 is coupled to one or more input/output (I/O) buses represented as I/O bus 264 via bridge(s) 266. I/O bus 264 provides communication between bridge 266 and I/O devices 268, network adapter 270, and mass storage device 272. I/O devices 268 include one or more of any of a variety of I/O devices 268, such as a cursor control device, keyboard, speaker, microphone, an infrared (IR) signal transmitter and/or receiver, a radio signal transmitter and/or receiver, etc. Network adapter 270 provides a connection to an external network or printer, such as to network 108 of FIG. 1 or printer 124 of FIG. 2. Mass storage device 272 provides storage for instructions and data to be used by processor 256. Mass storage device 272 can be any one or more of a magnetic disk (e.g., a hard disk drive or floppy disk and drive), an optical disk and drive (e.g., CD-ROM or DVD), magnetic tape and drive, etc.

In the illustrated example, printer driver 156 and filters 170 of FIG. 1 are implemented as a series of instructions, grouped as one or more functions, that are executed by processor(s) 256. The series of instructions are stored at different times in the various computer-readable storage media of the computer. The series of instructions are received by system 252 via a distributed media (e.g., floppy disk or CD-ROM) or from another external source (e.g., via network adapter 270). The instructions are then transferred to system memory 258 where they are accessible to the processor(s) 256. It is also to be appreciated that, at different times, selected instructions may exist in various cache memories (not shown) of system 252 (e.g., cache memories internal to processor 256, bridge 266, etc.).

The invention provides dynamic printer drivers using filters that are operating system-independent and printer-independent. Data that is to be printed is passed through a print pipeline that includes one or more filters that can alter various aspects of the data, one or more of which are operating system-independent and printer-independent. Additionally, filters can advantageously be added to the printer driver either during compilation of the driver or alternatively during run-time.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
  receiving a print request and corresponding data to be printed;
  converting the print request and corresponding data to an operating system independent and printer independent representation;
  using, while the date is in the operating system independent and printer independent representation, at least one of a plurality of print filters to alter the data; and
  converting the altered data to a printer-dependent representation.

2. A method as recited in claim 1, wherein the using comprises using a print driver having a subset of the plurality of filters added to the print driver during compilation.

3. A method as recited in claim 1, wherein the using comprises using a subset of the plurality of filters that are linked to at run-time.

4. A method as recited in claim 1, wherein one each of the plurality of print filters is to manipulate which of a plurality of devices is to be a destination device for the data.

5. A method as recited in claim 1, wherein the converting comprises using at least one of the plurality of filters to convert the data having the modified printing format to the printer-dependent representation.

6. A method as recited in claim 1, further comprising transferring the modified print request in the printer-dependent representation to a printer via a network.

7. A computer-readable media having stored thereon a computer program that, when executed by at least one processor, causes the at least one processor to perform functions including:
  receiving a print request and corresponding data to be printed;
  converting the print request and the corresponding data to an operating system independent and painter independent format; and
  when the data is in the operating system independent and printer independent format, using a plurality of print filters to modify the data to be printed.

8. A computer-readable media as recited in claim 7, wherein at least one of the plurality of print filters is maintained in a run-time loadable module independent of a module in which the program for receiving the print request, translating the print request, and using the plurality of print filters is maintained.

9. A computer-readable media as recited in claim 8, wherein the run-time loadable module comprises a dynamic link library (DLL).

10. A computer-readable media as recited in claim 7, wherein:
  one of the plurality of print filters comprises a filter to translate the print request and the corresponding data, as modified by the plurality of print filters, to a printer-dependent representation; and
  the computer program, when executed by the at least one processor, further causes the at least one processor to transfer the modified print request and corresponding data in the printer-dependent representation to a printer.

11. A computer-readable media as recited in claim 7, wherein each of the plurality of print filters is implemented in a different dynamic link library (DLL).

12. A computer-readable media as recited in claim 7, wherein the plurality of print filters are part of a printer driver, and wherein the computer program further causes the at least one processor to perform functions including:
  generating a settings data structure that identifies a plurality of aspects of how the data is to be printed; and
  passing the settings data structure from print filter to print filter to be used by each print filter to determine how the print filter is to modify the data.

* * * * *

UNITED STATES PATENT AND TRADEMARK OFFICE
CERTIFICATE OF CORRECTION

PATENT NO. : 7,102,768 B2 Page 1 of 1
APPLICATION NO. : 10/638572
DATED : September 5, 2006
INVENTOR(S) : John P. Daly et al.

It is certified that error appears in the above-identified patent and that said Letters Patent is hereby corrected as shown below:

On the title page, item (73), in "Assignee", in column 1, line 2, delete "LP.," and insert -- L.P., --, therefor.

In column 7, line 38, in Claim 1, delete "date" and insert -- data --, therefor.

In column 7, line 51, in Claim 4, after "one" delete "each".

In column 8, line 15, in Claim 7, delete "painter" and insert -- printer --, therefor.

Signed and Sealed this

Twentieth Day of January, 2009

JON W. DUDAS
*Director of the United States Patent and Trademark Office*